July 18, 1967   J. A. TREMBLAY ET AL   3,331,156
WINDOW STRUCTURE
Filed Jan. 11, 1965   5 Sheets-Sheet 1

INVENTORS
Joseph A. TREMBLAY
Raymond TREMBLAY
BY
ATTORNEYS

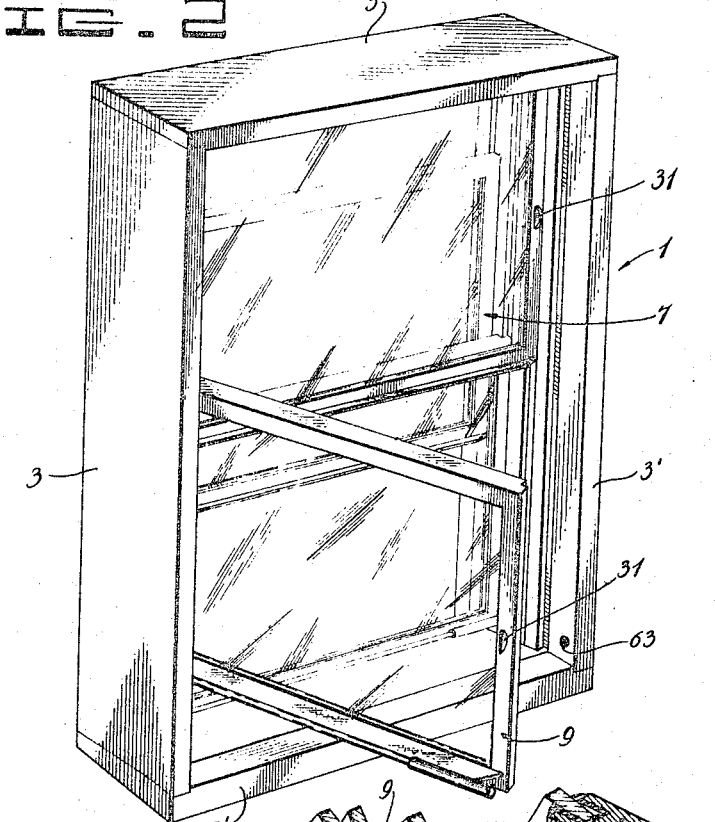
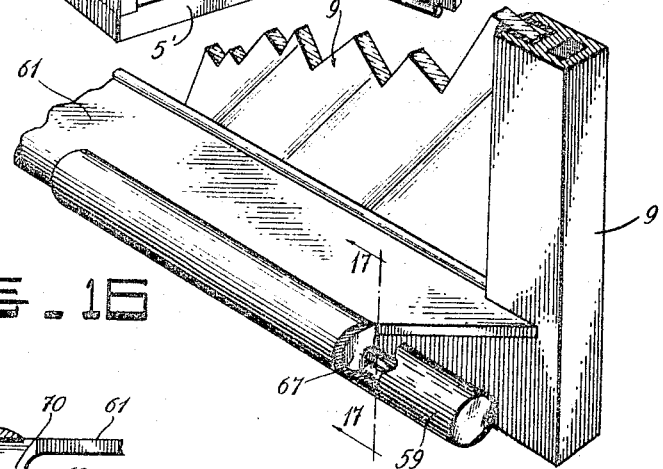
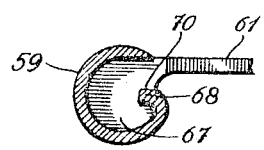

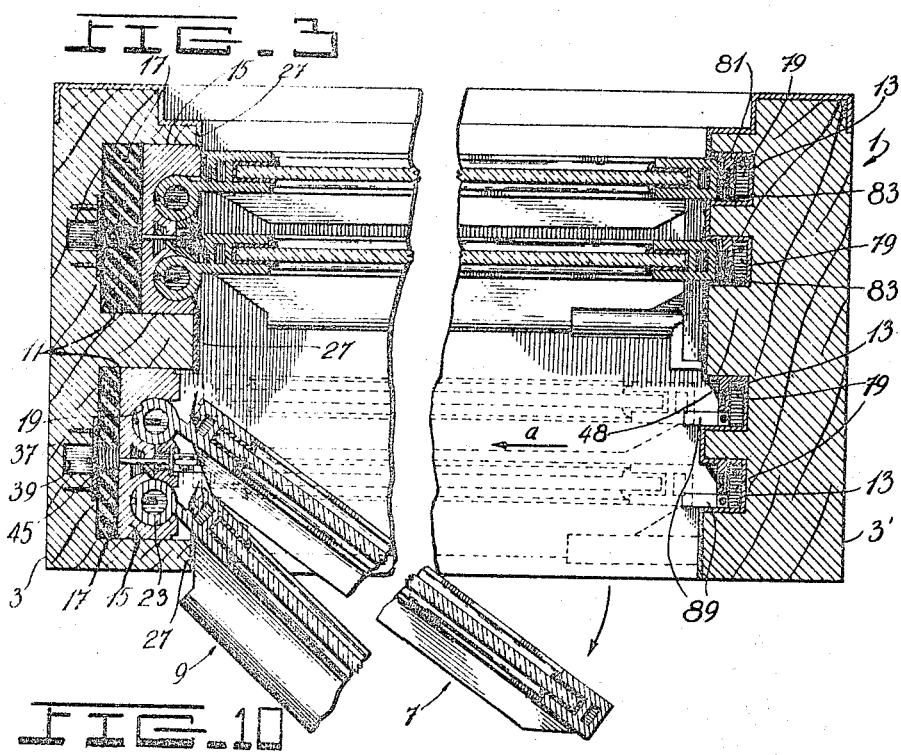
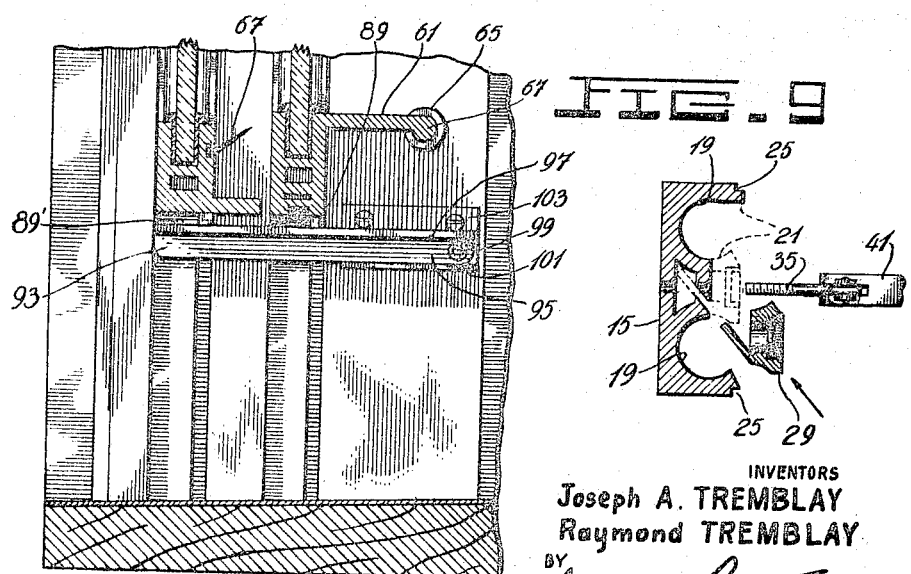

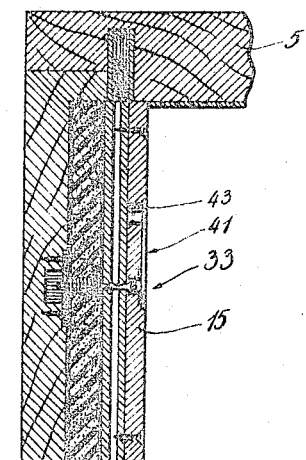
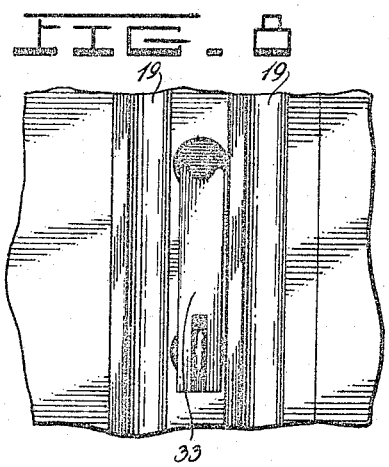
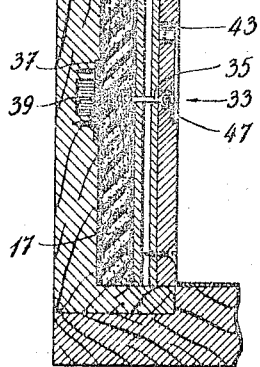
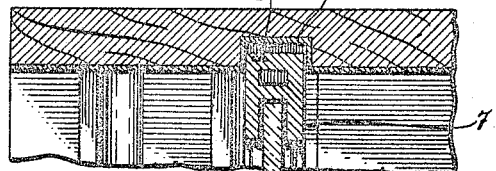
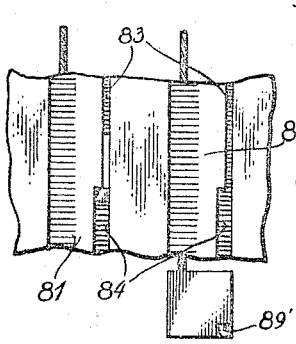
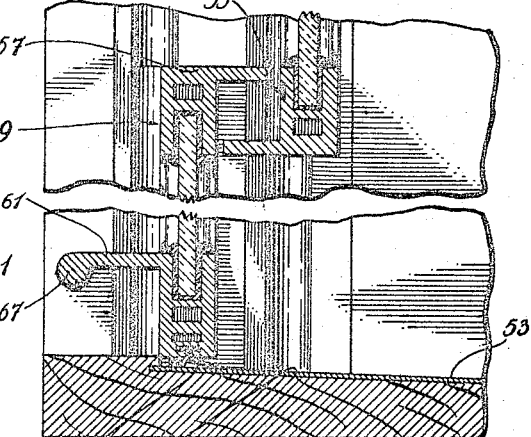
INVENTORS
Joseph A. TREMBLAY
Raymond TREMBLAY
ATTORNEYS

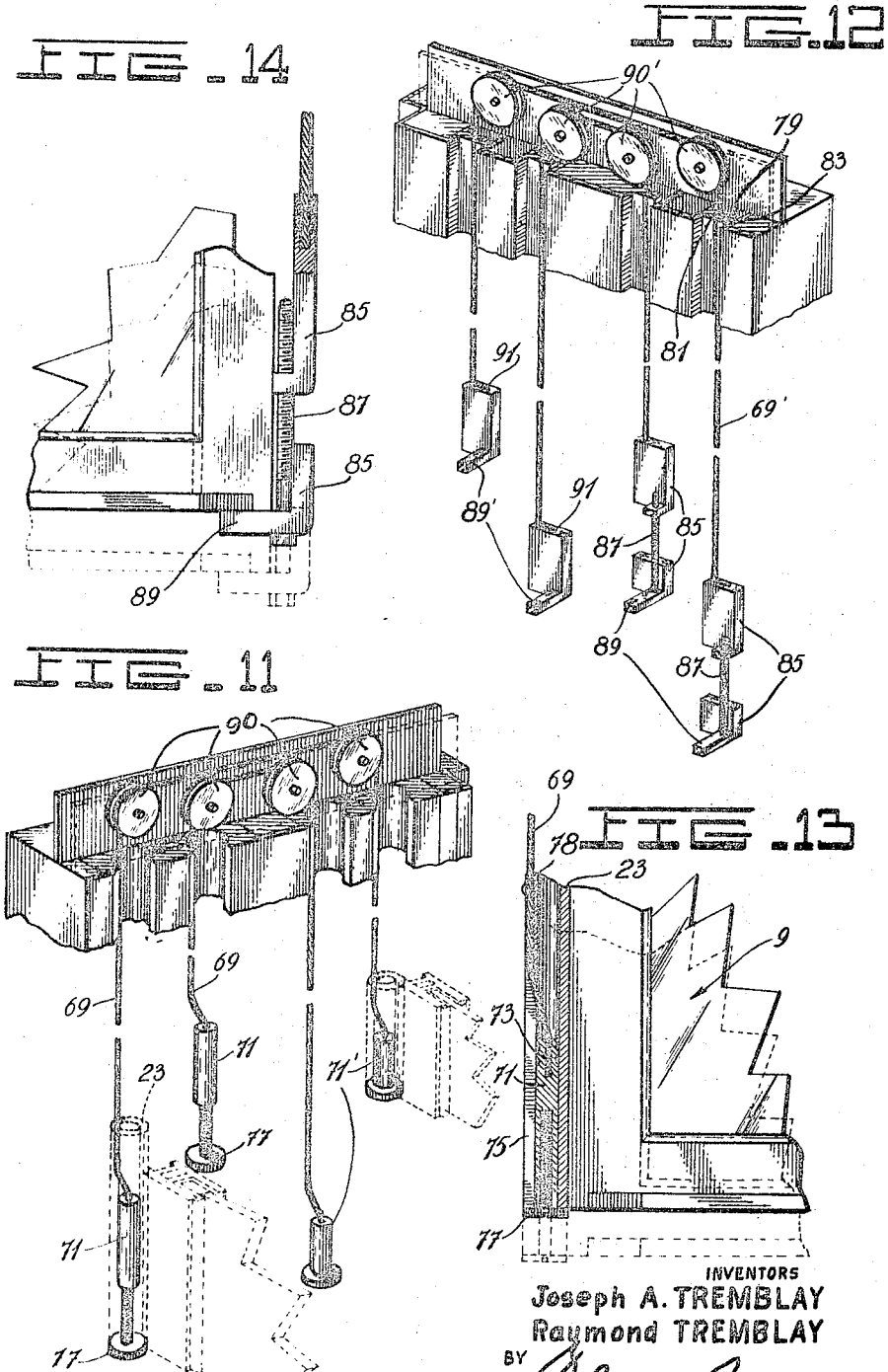

United States Patent Office 3,331,156
Patented July 18, 1967

3,331,156
WINDOW STRUCTURE
Joseph Armand Tremblay and Raymond Tremblay, Montreal, Quebec, Canada, assignors, by mesne assignments, to Vent-O-Matic Windows Limited, St. Hyacinthe, Quebec, Canada
Filed Jan. 11, 1965, Ser. No. 424,575
10 Claims. (Cl. 49—194)

The present invention relates to a novel window structure and more particularly to a window structure of the guillotine type as used in private dwellings, apartment houses, hotels and the like.

The main object of the invention is to facilitate the chore of washing the said windows.

In the more conventional type of windows, two operations are necessary to completely clean the glass panes, one taking place on the inside and the other on the outside of the room. There is no difficulty in washing on the inside but the outside work is not only often difficult and tiresome but also dangerous where some climbing has to be done or where the person doing the work has to sit or stand on the window sill with part or all of his body on the outside. As is well known, in higher buildings, professional window cleaners have to be hired to do this work and special precautions have to be taken in order to reduce the danger hazards.

For private dwellings, where no professional help is usually requested and where the dwelling is of two or more storeys, this cleaning work is not facilitated by the lack of climbing and washing facilities which are normally available to the professional window cleaners.

Improved sashless window structures have been devised in recent years and have found widespread acceptance because the panes to be washed can be removed from the frame. This is advantageous as all glass panes can be washed on the inside thus considerably reducing the tiresome work of washing the outside surfaces and avoiding the danger hazards inherent in climbing on window sills or standing on scaffolds or ladders.

However, housewives rapidly found that the removal and replacing of the window panes was not an easy work and even was an exhausting chore, where several windows were involved. Furthermore, there now existed the danger of breaking the expansive glass panes, which danger was practically non-existent with conventional windows.

The object of the present invention is therefore to remove or at least greatly reduce the above mentioned disadvantages by providing for washing all the panes on the inside at all times and this without having to remove the sashes from the frame. Most of the strenuous work and of the danger of injury to the window cleaners as well as the danger of breakage are thus removed with the window structure of the invention.

This object is obtained by providing a window structure wherein the glass panels or sashes open like the pages of a book.

More specifically, the invention is characterized by the provision of a window structure comprising: a frame having lateral jamb members each provided with a groove extending longitudinally therealong; a sash mounted in said frame with the lateral edges thereof nesting in said grooves; means mounting said sash in one of said grooves to slide therein and to pivot about an axis parallel to the longitudinal axis of said one groove; resilient means in said one groove adapted to press the sash toward the other groove, whereby the sash may be displaced manually against the resilient means to thus disengage it from the said other groove for pivoting action thereof about the said parallel axis.

In a preferred form of the invention, positive displacing means is provided which is capable of laterally moving the sash. This may be in the form of a plurality of lever actuated cams adapted to compress the resilient means to thus allow lateral displacement of the window sash and subsequent liberation of the edge opposite the pivoting edge from the emprisoning groove.

The invention will be better understood from the description that follows which has reference to the appended drawings, wherein:

FIG. 2 is a perspective view similar to that of FIG. 1 with one of the sashes pivoted inwardly and in washing position;

FIG. 3 is a horizontal cross-sectional view of the sash of FIG. 1, with two sashes shown in pivoted position;

FIG. 4 is a broken up vertical cross-sectional view through the center of the structure of FIG. 1;

FIG. 5 is a vertical cross-sectional view through a lateral jamb of the window frame;

FIG. 8 is a partial front view, on an enlarged scale, of the said displacing means;

FIG. 9 is a cross-sectional exploded view of the guiding element and displacing means;

FIG. 10 is a partial horizontal cross-sectional view through the two sashes on the outside of the window frame intended to illustrate the stopping means for abutment of the said panels in the low position thereof;

FIG. 11 is a perspective view of the interconnecting movement transmitting cable means for the various sashes of a window structure and on the displacing means side thereof;

FIG. 12 is a perspective view of the interconnecting movement transmitting cable means on the opposite side of the window sash;

FIG. 13 is a partial cross-sectional view intended to illustrate the lower adjustable parts of the movement transmitting means of FIG. 11;

FIG. 14 is a partial front view of the lower part of the movement transmitting means of FIG. 12;

FIG. 15 is a front view of the lower part of the movement transmitting means of FIG. 12 as shown mounted on a window sash;

FIG. 16 is a perspective view of the locking device at the lower end of a sash, and FIG. 17 is a cross-sectional view taken along line 17—17 of FIG. 16.

Figure 1:
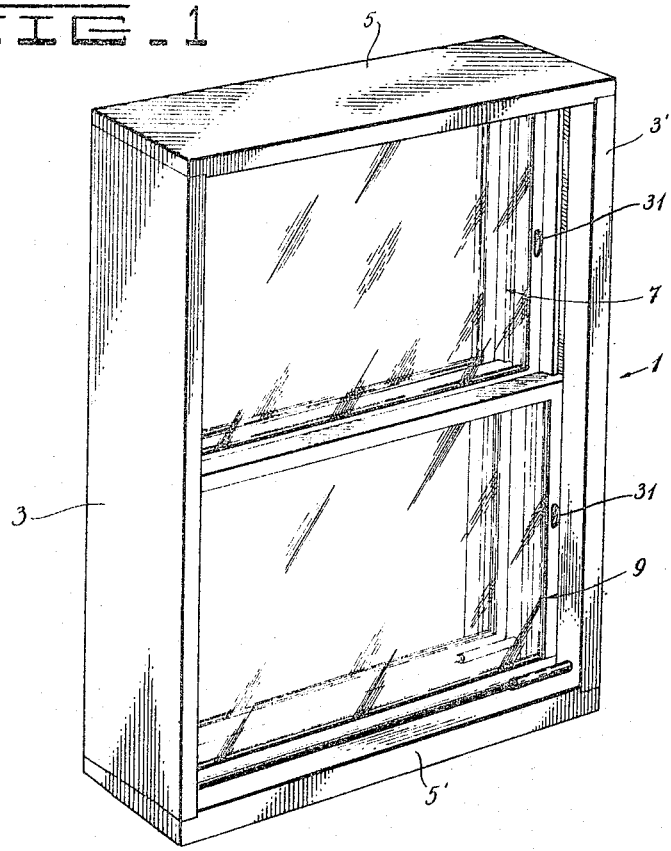
FIG. 1 illustrates, in a perspective view, a window structure of the guillotine type to which the improvement of the invention has been incorporated.

Generally, and as seen in FIGS. 1 and 2, the window structure 1 of the invention comprises a substantially rectangular frame 1 formed of jamb members 3, 3′ and header and sill members 5 and 5′. As in conventional frames, two pairs of sashes are provided one pair on the inside of the enclosure and the other on the outside thereof. Since the two pairs are alike, description of only one will be made wherein the top sash will be numbered 7 and the bottom sash will be 9.

As said previously, the invention consists in providing means whereby each sash can be slid laterally in its plane as mounted in guillotine manner (FIG. 1) whereby one edge thereof may be freed from its receiving groove and further means is provided whereby the sash may be pivoted inwardly as sash 9 in FIG. 2. It should of course be understood that the sashes could be made to pivot outwardly but this would be of no interest since the sashes are washed from the inside of the room.

Another object of the invention is to provide for the sliding of the sashes in their own planes, in guillotine manner, as in standard conventional sashes of this type.

FIG. 2 illustrates the top sash of the outside pair as having been lowered whereas the lower sash 9 of the inner pair is shown as having been raised slightly, this to provide indirect ventilation.

Figure 6:
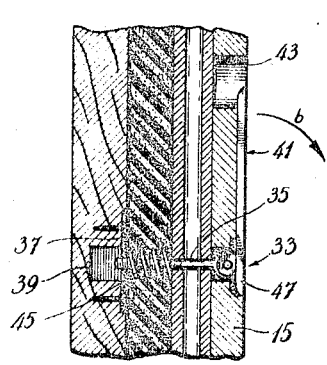
FIGS. 6 and 7 are partial views of FIG. 5 intended to illustrate the positive sash displacing means in inoperative and operative position, respectively.
Figure 7:
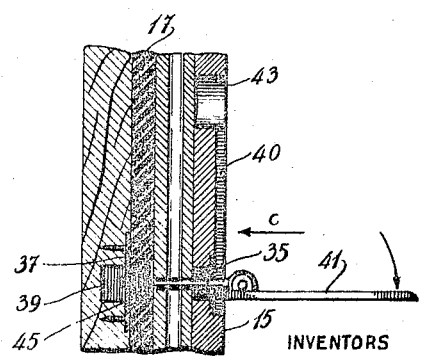

The general principle of the invention may be grasped from a study of FIGS. 3, 6 and 7, particularly. Generally, one jamb member 3 is provided with a pair of wide grooves 11 while jamb member 31 is provided with two pairs of longitudinal narrow grooves 13. An elongated guiding element 15 is received in each of the wide grooves 11 and, while held against longitudinal vertical displacement, is slidable in the general direction of grooves 13. Resilient means 17 is provided between each guiding element 15 and the bottom of the corresponding groove 11. Sashes, 7 and 9 are mounted for sliding displacement longitudinally of the guiding elements 15 as well as for pivoting about an axis parallel to the longitudinal axis of the said guiding elements 15, all in a manner to be more fully described later. Finally and as will be understood, the transverse width of glass sashes 7, 9 when mounted on guiding elements 15 in the aforementioned manner is greater than the distance between grooves 11 and 13 as measured across frame 1 so that the assembly is normally emprisoned in the grooves in the manner shown in the top portion of FIG. 1.

With the above description in mind, it will be understood that the sashes 7, 9 may be slid leftward against the resilient means 17 as shown by arrow $a$ of FIG. 3 whereby to disengage the rightward edge of the said sashes from their receiving grooves 13 and allow their pivoting inwardly as shown in the lower part of the FIG. 3.

Resilient means 17 is preferably an elongated foam rubber pad that can easily be compressed an appreciable extent to thus provide a good securement for the rightward edge of the sash in groove 13. It will be understood that rubber pad 17 may be replaced by any suitable spring structure.

The guiding element is, as illustrated in FIG. 9, preferably a metal extrusion, symmetrical about a central plane through its longitudinal axis and formed with a pair of circular arcuate channels 19 terminating into openings 21 facing inwardly of the frame in mounted position of the said element 15.

For pivotally and slidably mounting the sashes 7 and 9 into this guiding element 15, a circular bead 23 (FIG. 3) is provided which is connected to the adjoining edge of the sash and fits snugly but slidably into the receiving arcuate channel 19. The said bead 23 which, incidentally, could be an integral part of the extrusion defining the sash for the glass panes, constitutes, along with arcuate channel 19, the pivoting and sliding means for each of the said sashes.

It should be noted that each guiding element 15 is provided with corner notches 25 adapted to abut the projecting edges of arresting plates 27 removably secured on the inner surface of jamb member 3. This will prevent guiding elements 15 from accidentally falling out of the wide grooves 11.

It is of course of interest to be able to remove sashes 7, 9 completely from the guiding elements 15 without having to remove the latter elements in the process. For this purpose, the guiding elements are formed each with a removable center piece 29 adapted to be fixed to the guiding element in a manner to be described later. For the time being, it should be observed that the lateral surfaces of this center piece 29 are arcuate and merge with the arcuate surfaces of channels 19. As will be observed from FIG. 9, whenever center piece 29 is removed, the circular arcuate channels 19 have an extent less or at most 180° whereby the circular beads 23 may be removed.

Sashes 7, 9 may be pivoted by first manually sliding them along arrow $a$ of FIG. 3 but a more positive device would be an advantage.

This could be in the form of a finger grip provided on the sash such as the shallow wells 31 (FIGS. 1 and 2) formed on the risers of the sashes on the side thereof opposite the pivoting edge.

Another positive and efficient way of laterally displacing sashes 7, 9 is illustrated in FIGS. 3, 5, 6 and 7, particularly.

It consists of a set of lever-actuated cams 33 mounted in vertical alignment in the wide grooves 11 and adapted to press the guiding elements inwardly into the grooves and force the said elements against the resilient pads 17 an extent sufficient to free the opposite edges of the sashes (7, 9) from the receiving edges thereof to thus place the said sashes into position to be pivoted.

Each cam assembly 33 consists of a rod 35 which extends freely through the corresponding guiding member 15 and resilient pad 17 and which is fastened, at one end, to the bottom of wide groove 11 as by being threaded to a plate 37 secured in the bottom of the groove and bridging a recess 39 cut in the jamb member 3. The cam itself is the extended portion 47 of a bar 31 which is pivotally connected, intermediate the ends thereof, to the other end of rod 35; the said extended portion 47 being adapted to press against the guiding element when the other portion of the bar, in relation to the pivot connection, acts as the said lever and is pivoted away from the element. An aperture 43 is provided around the free end of bar 41 to allow for finger gripping the said bar. Finally, a return spring 45 is provided between plate 37 and the back surface of element 15.

Returning now again to FIG. 9, it will be seen that rod 35 also serves for fastening center piece 29 and element 15 together.

With the above description in mind, and particular reference to FIGS. 6 and 7, it will be understood that whenever lever bar 41 is pivoted in accordance with the directions indicated by arrow $b$ of FIG. 6, the cam end 47 thereof will press against element 15 and force the latter leftward in accordance with the arrow $c$ of FIG. 7 and against the combined resilient action of pad 17 and spring 45 both of which will act to return element 15 to inoperative position of FIGS. 5 and 6 whenever lever bar 41 is returned to inoperative position, that is flat against element 15 and preferably retrieved in a nesting groove 40 (FIG. 7).

Lever actuated cams 33 are preferably located, between two channels 19 as illustrated in FIG. 8, and a study of FIG. 5 will show that if both are to be actuated, it is necessary that the distance between them be at least as great as the height of a sash.

Other features illustrated in the various figures thus far referred to are of more or less standard construction. Thus, the bottoms of grooves 13 are provided with wind breaker strips 48 and the same applies also to grooves 49 formed in the undersurface of sill and header cross member 5, 5' (FIG. 4). As to the sill, it is formed with the usual outwardly inclined sill surface 51 which is preferably covered, as with the other inner surfaces of the frame, with a plastic covering 53.

Another wind breaker strip 55 may be provided on the inner side of the top sash 7 which, when abutting in closed position a ledge 57 extending outwardly from the top of the bottom sash 9 (see FIG. 4) will prevent outside air from seeping through and into the house.

FIGS. 1, 16 and 17 illustrate a convenient and simple manner of ensuring locking of a sash 9 by providing a sliding hollow locking peg 59 capable of projecting laterally from a forwardly extending finger grip apron 61 located at the bottom of sash 9. The said locking peg 59 is introduced into a hole 63 suitably located on the inner surface of jamb member 3' when sash 9 is set into closed position.

As shown in FIG. 17, peg 59, which may be of plastic construction, is a sleeve like member adapted to slide over a cylindrical lobe 67 of apron 61 and guided thereon by such means as an inwardly bent ledge 68 riding in a square notch 70.

Preferably, the two glass sashes of the inner pair are interconnected to the sashes of the outer pair through an interconnecting movement transmitting cable means and, as shown in FIGS. 11 and 12, particularly, the said cable means joins a lower sash of one pair to an upper sash of the outer pair and an upper sash of said inner pair to a lower sash of said outer pair. In other words, the lower sash of the inner pair is connected to the upper sash of the outer pair and the upper sash of the inner pair is connected to the lower sash of the outer pair. Thus, the sashes are always balanced so that it is possible to raise or lower a sash to a predetermined position and hold it to that position without having to provide any special retaining means.

The interconnecting cable means for the pivoting edge of the sashes is shown in FIG. 11 whereas the interconnecting means for the opposite edge of the glass panels is shown in FIG. 12.

In the first case, the cables 69 are connected at one end to a sleeve 71, as at 73 of FIG. 13. For this purpose, bead 23 of the pivoting means of the sashes is hollowed out at least in the lower portion thereof and sleeve 71 is slidable in the said bead. Each cable 69 reaches sleeve 71 through a suitable longitudinal end slit 75 as shown also in FIG. 13. A screw 77 having a head wider than the diameter of the bore of head 23 threads into the sleeve 71 whereby the length between interconnected panels may be slightly adjusted. It will be noted also that sleeves 71' at the other end of cables 69 are not meant to be adjustable and are provided with a wide head whereby to be retained in the bottom of the bores of the corresponding beads 23. A slit 75 is also provided in each of the beads 23 corresponding to the sleeves 71' to permit insertion and withdrawal of the said sleeve as is the case with sleeve 71.

In order to prevent wear and friction from developing by contact of cables 69 against the wall of arcuate channels 19 during displacement of the sashes, the said cables are inserted in a suitable recess 78 extending longitudinally of bead 23 as clearly shown in FIG. 13 to thereby nest the said cables completely and out of contact with the walls of channels 19.

The interconnecting movement transmitting cable means for the other side of the sashes is slightly different since there is no circular beads 23 provided on that side. However, and as illustrated in FIGS. 3 and 12, suitable enclosures are formed in each of the grooves 13 by the provision of a partition wall 81 extending partly across the lateral width of the grooves but terminating short thereof to leave a longitudinal passage 83 for a purpose to be determined later.

As clearly seen in FIG. 12, enclosures 79 serve for the reception of cables 69 and their isolation from the adjoining lateral edges of the sashes.

One end of each cable 69 on that side is connected to a two block assembly 85 interconnected by an adjustable bolt 87. The lower block of this block assembly 85 has a supporting lug 89 projecting perpendicularly from bolt 87. It will again be seen that adjustment of bolt 87 will vary the distance between the two blocks of the block assembly 85.

The other end of cable 69 is connected to a single block 91 also provided with a supporting lug 89'.

As will be understood, lugs 89, 89' serve for the support of one corner edge of a sash as illustrated in FIGS. 3 and particularly 14. Again it is possible to adjust the length of cable 69 between two interconnected sashes by adjusting bolts 87. Also, passages 83, on the outer side of frame 1 are widened as at 84 for the movement of lugs 89'.

Finally, cables 69, 69' are trained around suitably provided sheaves 90, 90'.

With the above described arrangement, when the sashes 7, 9 of the inner pair are displaced, the glass panels of the outer pair to which they are interconnected will be displaced a corresponding amount but in opposite direction.

It will also be understood that the weight of the interconnected sashes are distributed evenly on the sleeves 71, 71', on the one hand, and the lugs 89, 89', on the other hand. Consequently, when a sash is shifted laterally to disengage the rightward edge thereof from the adjoining narrow groove, the corresponding lug 89 is of no longer use so that the weight is thrown on the corresponding sleeve 71. It may be difficult to vertically displace the sashes under these conditions and it may also be found difficult to readjust a sash on its corresponding lug 89 after the washing is done.

In order to avoid this difficulty, an arresting plate 93 (FIG. 10) is provided. It will be understood that with this arresting plate, when the two outer sashes have been made to rest thereon the inner sashes may be lifted slightly a little more whereby to free them completely from their supporting lugs 89, to allow them to be easily slid laterally and then pivoted inwardly.

The arresting plate is preferably an angular member having a web 95 and a flange 97 over which the outer sashes are adapted to rest through their supporting lugs 89, 89'. Arresting plate 93 is pivoted at one extreme end 99 with the edge of its web 95 resting on the flange 101 of a second angular member 103. Thus, whenever it is desired to have the two outer sashes supported by this arresting plate, the latter is pivoted to the position shown in FIG. 10. Otherwise, when not needed, the said plate 93 is pivoted to a vertical position out of the way of the outer sashes.

Although a specific embodiment of this invention has just been described, it will be understood that various modifications may be made thereto without departing from the spirit of the invention.

We claim:
1. A window structure comprising:
 (a) a frame having lateral jamb members each provided with a groove extending longitudinally therealong;
 (b) a sash mounted in said frame with the lateral edges thereof nesting in said grooves;
 (c) a guiding element mounted in one of said grooves for sliding movement in the direction of the other groove, said guiding element being formed with a circular arcuate channel running longitudinally thereof and defining an opening facing inwardly of said frame;
 (d) a circular bead slidably mounted in said circular arcuate channel and connected to the adjoining edge of said sash through said opening, whereby said glass panel may slide longitudinally in said channel and pivot about the axis thereof when the opposite edge of the sash is free from said other groove;
 (e) a resilient pad between said guiding element and the bottom of said one groove adapted to press said element in the direction of said other groove;
 (f) cooperative displacing means on said element and on the bottom of said one groove including at least one lever actuated cam adapted to press on said guiding element and force the said element against said resilient pad an extent sufficient to free the opposite edge of the sash from the receiving edge thereof to thus place the said sash in a position to be pivoted.

2. A structure as claimed in claim 1, wherein said displacing means further includes a rod, for each cam, extending freely through said member and pad and fastened, at one end to the bottom of said groove; said lever actuated cam being the extended portion of a bar pivotally connected, intermediate the ends thereof, to the other end of said rod; the said extended portion adapted to press against said guiding element when the other portion of said bar, in relation to the pivot connection thereof, acting as the said lever, is pivoted away from said element.

3. A structure as claimed in claim 2, wherein said rod of said displacing means is screwed to a plate secured in the bottom of said groove to thus afford adjustment of the guiding element in relation to said bottom.

4. A structure as claimed in claim 1, wherein said sash is formed of a glass pane and a circumscribing sash; a sliding locking peg mounted on said sash adjacent the jamb member opposite that provided with the guiding element; said jamb member having a suitable recess for the reception of said sliding peg when said displacing means is in the inoperative position.

5. A window structure comprising:
(a) a frame having first and second lateral jamb members; said first member having a pair of narrow parallel grooves extending longitudinally therealong and said second member having a wide groove extending longitudinally therealong in facing relation with the narrow grooves;
(b) a pair of sashes mounted side by side in parallel planes in said frame with the lateral edges thereof received in said narrow and wide grooves;
(c) an elongated guiding element received in said wide groove and mounted therein to be held against longitudinal displacement and to be slidable transversely of said wide groove in the direction of said first jamb member; said guiding element being formed with adjacent circular arcuate channels running longitudinally thereof, each defining an opening facing a narrow groove of the first jamb member;
(d) a circular bead slidably mounted in each channel and connected to the edge of an adjoining sash of said pair of sashes through said opening whereby said sashes may slide longitudinally in said channels and pivot about the axes thereof when the opposite edges of the sashes are free from the narrow grooves;
(e) a resilient pad between said guiding element and the bottom of said wide groove adapted to press said element in the direction of said first jamb member;
(f) cooperative displacing means mounted transversely centrally on said element and on the bottom of said wide groove including a plurality of lever actuated cams adapted to press on said guiding element and force the said element against said resilient pad an extent sufficient to free the opposite edges of the sashes from the receiving narrow edges thereof to thus place the said sashes in a position to be pivoted.

6. A window structure as claimed in claim 5, wherein said displacing means further includes, for each cam, a rod extending freely through said member and pad and fastened, at one end, to the bottom of said wide groove; the cam being the extended portion of a bar pivotally connected, intermediate, the ends thereof, to the other end of said rod; the said extended portion adapted to press against said guiding element when the other portion of the bar, in relation to the pivot connection thereof, acting as said lever, is pivoted away from said element.

7. A window structure comprising:
(a) a frame having first and second lateral jamb members; said first member having two pairs of narrow parallel grooves extending longitudinally therealong and said second member having a pair of wide grooves extending longitudinally therealong in facing relation each with a pair of narrow grooves;
(b) two pairs of sashes mounted side by side, two by two, in said frame with the lateral edges thereof received in said narrow and wide grooves; the sashes of a pair, in closed position of the window lying one above the other and, in open position thereof, one next to the other;
(c) an elongated guiding element received in each wide groove and mounted therein to be held against longitudinal displacement and to be slidable transversely of said wide groove in the direction of said first jamb member; said guiding elements being formed with adjacent circular arcuate channels running longitudinally thereof, each defining an opening facing a narrow groove of the first jamb member;
(d) a circular bead slidably mounted in each channel and connected to the edge of an adjoining sash of said pairs of sashes through said openings whereby said sashes may slide longitudinally in said channels and pivot about the axes thereof when the opposite edges of the sashes are free from the narrow grooves;
(e) a resilient pad between each guiding element and the bottom of its receiving wide groove adapted to press the corresponding guiding element in the direction of the first jamb member;
(f) cooperative displacing means, mounted through each element and on the bottom of the corresponding wide groove, including a plurality of lever actuated cams adapted to press on the corresponding element and force the said element against the corresponding resilient pad an extent sufficient to free the opposite edge of the sash from the receiving narrow edge thereof to thus place the said sash in a position to be pivoted.

8. A window structure as claimed in claim 7, wherein said displacing means further includes, for each cam, a rod extending freely through said member and pad and fastened, at one end, to the bottom of said wide groove; the cam being the extended portion of a bar pivotally connected, intermediate the ends thereof, to the other end of said rod; the said extended portion adapted to press against said guiding element when the other portion of the bar, in relation to the pivot connection thereof, acting as said lever, is pivoted away from said element.

9. A window structure as claimed in claim 7, wherein each pair of sashes comprise, in closed position, a lower and an upper sash; interconnecting movement transmitting cable means joining a lower sash of one pair to an upper sash of the other pair and an upper sash of said one pair to a lower sash of said other pair.

10. A window structure as claimed in claim 9, wherein said beads are hollow at the bottom and said last named means comprises, on the wide groove side of said frame:
a cable for each pair of interconnected sashes;
a sleeve slidably mounted in the hollow of the beads of the interconnected pair of sashes;
means securing the ends of said cables to the sleeves of each interconnected pairs of sashes;
means adjusting the position of one sleeve of each pair in the corresponding hollow and locking said sleeve therein;
said movement transmitting cable means further comprising, on the narrow groove side of said frame;
a cable for each pair of interconnected sashes;
a block for each sash having a supporting lug slidable in the corresponding narrow groove and supporting the corresponding sash;
means securing the ends of said cables to the blocks of sach interconected pair of sashes; and wherein one block of each pair of sashes is made of two separate parts interconnected by distance adjustable means, whereby the cable distance between two interconnected sashes may be adjusted.

References Cited
UNITED STATES PATENTS

| | | | |
|---|---|---|---|
| 1,002,777 | 9/1911 | Sturmann et al. | 49—174 X |
| 1,119,365 | 12/1914 | Morris | 49—121 X |
| 1,783,784 | 8/1932 | Poock | 49—174 X |
| 2,663,055 | 12/1953 | Marcus | 49—174 X |
| 3,065,507 | 11/1962 | Cloutier et al. | 16—196 X |
| 3,248,821 | 5/1966 | Johnson | 49—175 |

DAVID J. WILLIAMOWSKY, *Primary Examiner.*

HARRISON R. MOSELEY, *Examiner.*

A. I. BREIER, *Assistant Examiner.*